Patented Nov. 19, 1940

2,221,815

UNITED STATES PATENT OFFICE 2,221,815

BOILER WATER CONDITIONING

Cyrus W. Rice, Pittsburgh, Pa.

No Drawing. Application June 7, 1938,
Serial No. 212,302

8 Claims. (Cl. 210—23)

This invention relates to a water treatment, adapted particularly to the treatment of water which is heated in steam-generating boilers or lower temperature heaters. The general purpose of my invention is to provide a method of water treatment capable of inhibiting both scale and adherent sludge formations in boilers or heaters.

Various methods have been proposed and employed for inhibiting the deposition of salts which are insoluble under the conditions normally existing in such instrumentalities.

In my prior Patent No. 2,085,828, dated July 6, 1937, I have disclosed the use of a water-treating colloid consisting of reaction products of phosphoric acid with starches, such for example as tapioca starch, which is reactive with the phosphoric acid. In my co-pending application Serial No. 141,726, filed May 10, 1937, I disclose the use in water treatment of colloids which are positively reactive with calcium and magnesium compounds to remove calcium and magnesium in the water. These colloids are the reaction products of phosphoric acid with the protein-casein derived from milk and the protein-glycinin derived from soya beans.

In my application Serial No. 182,809, filed December 31, 1937, I further disclose that lactic acid provides a reagent for rendering certain proteins soluble for water to form stable highly dispersive colloidal solutions. In that application, I further disclose that proteins other than casein and glycinin, such as proteins of the class represented by a protein derived from cotton seed, and proteins derived from legumes generally, may be reacted with either phosphoric acid or lactic acid to provide stable colloid-producing materials, reactive with calcium and magnesium in preventing hard sludge formations in boilers. In my above-identified applications and patent it is explained that a reaction with an alkaline reagent selected from among those reactive with acids, such as phosphoric acid and lactic acid, is desirable when the boiler water which is to be treated does not have a substantial alkaline concentration, such as that contained by waters from lime soda and zeolite treatments.

I now find further, that I can react with commercial advantage an oil-freed soya bean flour (with its contained protein) directly with an acid reagent, such as phosphoric acid, lactic acid, or citric acid, in preparation for further reactions with calcium, magnesium, sulphate, and/or silicate, substantially as described for the similar use of extracted protein in my prior applications mentioned above. Such acidic reagents are to be considered also as sodium conditioning agents for heating instrumentalities carrying excessive amounts of soda, into which the reacted colloid is introduced. I have found also that the flours, or meals, of certain legumes, such as soya beans, peanuts, and peas may if desired, be used as boiler-conditioning materials following previous conditioning reaction with one of the suitable acidic reagents. While I have thus far disclosed the use of acidic protein materials, it is not my intention wholly to confine myself to their use for I have found in practice that the proteins, and protein-carrying materials, also prove valuable in preventing silica scale-deposition when reacted directly with soda-conditioning agents, and without pretreatment with acid, such as phosphoric acid, lactic acid, or citric acid.

The protein requirements in this direct application is greater, especially with the coarser protein-carrying materials, such as soya bean meal (as distinguished from soya bean flour) because the digestion, or peptization is not complete as with the acid-treated products. They also lack the high dispersion value of the acid products and are, therefore, slower in their reaction in correcting objectionable conditions for which they are employed.

The preponderant scale-producing elements in all waters are calcium and magnesium. These are contained in solution in all industrial water supplies, together with other reactive constituents such as carbonates, silicates, and sulphates. Where the concentrations of these materials in an untreated or raw water reach their maximum solubility under the temperature conditions and salt concentrations existing within boilers, and like instrumentalities, they react in the formation of calcium and magnesium silicates, calcium sulphate and/or calcium and magnesium carbonate. The most troublesome of these depositions are the silicates. This is because of their very dense, adherent nature and their property of cementing other solids together.

The more common practices in use for preventing these depositions are to precipitate the calcium and magnesium as insoluble sludges of calcium carbonate and phosphate and magnesium hydroxide. While soda ash, caustic soda, and many sodium phosphates are used for this purpose, they have no influence whatsoever in preventing the silicates from cementing the sludge products of these chemical reactions into solid formations.

Starches and tannins were used over many years for correcting the effect of certain waters that failed to respond satisfactorily to such chemical treatments, and it has only been recently recognized that silica was the influence which caused failure in the functioning of those agencies, and that the addition to the feed water and boiler concentrates of certain organic constituents in sufficient quantities to prevent silica deposition was necessary. Numerous observations in the field have shown tannins to have no appreciable controlled influence in preventing silica depositions within the boiler under normal treating conditions, although it has proven beneficial, and is being used, for reducing feed line, pump, and heater depositions of calcium and magnesium.

Experience in the field has, also, taught that the value of starches in destroying the cementing properties of silica is to a great extent rendered ineffectual when the soda concentrations in boilers exceed 15 to 18 grains total alkalinity. When relatively high silica concentrations exist, it is even necessary to keep the hardness in the waters near zero in order to prevent scale deposition within the boilers, although starch be present.

For the definite prevention of silica scale, it has, therefore, invariably been required that the starch be supplemented with phosphates, because they are not converted directly to caustics at boiler temperatures as is soda ash, but remain as phosphates and thus function in the greater removal of calcium and magnesium from the boiler water. The destructive effect of high soda concentration on starches, thus greatly lessens their effectiveness and largely prevents the use of starches in plants using treated water from lime-soda and/or zeolite softeners, and in plants where the excess introduction of free sodas into the feedwaters is unavoidable.

This well-known defect in the functioning of starches led the applicant initially to experiment with other materials, in order to discover some boiler-conditioning agent more satisfactory than starch. His attention was early directed to the fact that sea moss, though it contains a large proportion of starch, yet was capable of maintaining boilers clean and free from scale when used with waters carrying as much as 4 to 5 grains per gallon total hardness. It proved more stable than starch under high boiler pressure, and high soda concentrations. Sea moss was found to give better internal boiler conditions than starch, when used in a quantity no greater than one-fourth or one-fifth the weight of the starch. This indicated the presence in sea moss of some constituent which is positively reactive with calcium and magnesium, to form some salt-like organic compound of the calcium and magnesium radicals. This constituent proved to be a protein, present in the sea moss in a quantity of about 18 per cent its mass, and capable of reacting with calcium and magnesium to form with them complex salt-like compounds.

The applicant's appreciation of these facts led him to proceed further with the investigation of various proteins of sufficiently moderate cost to permit them to be used as boiler-conditioning agents. By far the most satisfactory materials, taking both cost, ease of preparation, and effectiveness into consideration, proved to be first the protein glycinin, extracted from soya beans, and then soya bean flour itself. This latter, according to the authority of Dr. J. B. Phillips and as quoted in his article in the July 20, 1934, issue of "Chemistry and Industry" contains:

| | Per cent |
|---|---|
| Protein | 40 |
| Fat | 20 |
| Carbohydrates | 20 |
| Lecithin | 2 |
| Crude fibre | 4 |
| Ash | 5 |
| Moisture | 9 |

On a dry basis and oil-free, the composition of soya flour approximates:

| | Per cent |
|---|---|
| Protein | 59 |
| Crude fibre | 6 |
| Carbohydrates | 28 |
| Ash | 7 |

Its principal protein constituent, glycinin, is, as extracted, substantially insoluble in water.

Experiments carried out in the laboratory showed this to react with phosphoric, lactic and citric acids in the formation of salt-like compounds, all having high water-solubility, and a very high dispersion value. A typical reaction of this sort may be expressed graphically, as follows:

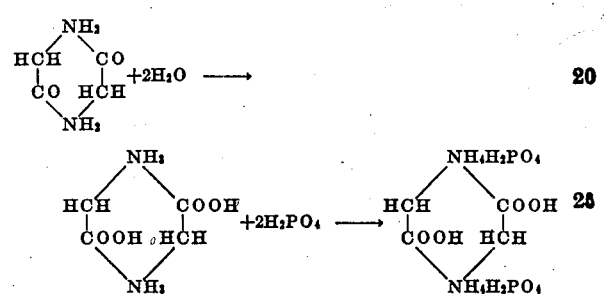

The addition to these compounds of sodium, potassium, or ammonium hydroxides, or carbonates in excess, produced other complex alkaline, glycinin, salt-like derivations, all having the same high water-solubility, and the same dispersion properties as the organic acid compounds. A typical reaction of this latter sort may be shown graphically as follows:

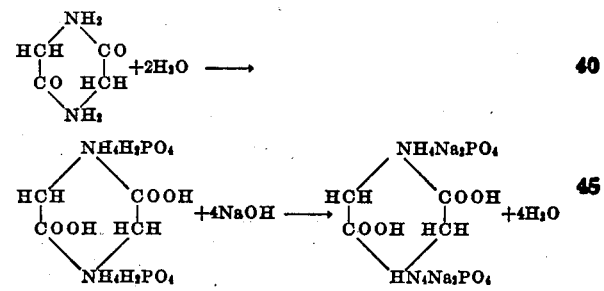

The further addition of calcium and magnesium chlorides, and sulphates, to these alkaline products of glycinin produces other even more complex salt-like compounds, such as calcium, or magnesium-glycinin phosphates, or lactates. These latter compounds have a somewhat lower specific solubility for water than either the acid or alkaline products mentioned above.

The high reactivity of the solubilized glycinin, used either as an extract or as a constituent of soya bean flour, with calcium and magnesium radicals prevents them from reacting to form structural deposits of either sulphates or silicates. It is thus possible for the boiler concentrates to carry a high hardness content without producing scale-forming depositions of calcium and magnesium compounds. Also, the reaction products of the protein with calcium and magnesium are crystalloid bodies which act mechanically so to involve the silica content of the water that it is prevented in large measure from itself forming deposits, and its capacity to cement any solid bodies which may be present in the boiler is thus destroyed.

The reacted soya bean flour, as well as reacted glycinin per se, thus functions mechanically as well as chemically, in keeping boilers free of scale and depositions. It is this fact, coupled with the fact that the protein is able to withstand a much higher alkalinity than (for example) starch, which makes this material capable of replacing a combination of several other boiler conditioning agents, and thus leads to lower chemical requirements for boiler conditioning practices.

The glycinin of the soya bean flour has much higher stability than that of starch, in the performance of its boiler-conditioning functions. Thus, the bond between starch and calcium being weak, it is necessary to maintain a low hardness content in the boiler concentrates when using a combined starch and phosphate treatment. The very fact that the cementing effects of silica are prevented in practice through combination glycinin-phosphate treatments in the presence of appreciable calcium concentrations in the boilers and are not prevented with similar phosphate and starch combinations, definitely proves the greater values of glycinin-phosphates.

Soya bean flour, and its derivative protein, thus has the remarkable property of giving adequate boiler protection either with a low alkalinity, or high alkalinity, content of the boiler concentrates, and possesses the quality of nullifying the scale-forming effects of both those acid and basic radicals in the boiler concentrates which are jointly responsible for the formation of hard sludge and scale deposits in boilers. The completeness of this effect is clearly due to the amphoteric nature of the protein content of the soya bean flour. It is not due specifically to the preliminary reaction with phosphoric acid, since lactic acid is similarly effective in rendering the protein, or protein content to an increased extent water-soluble.

The manner in which the protein of the soya bean flour forms a firm and enduring chemical bond with the scale-forming calcium and magnesium radicals may be illustrated graphically as follows:

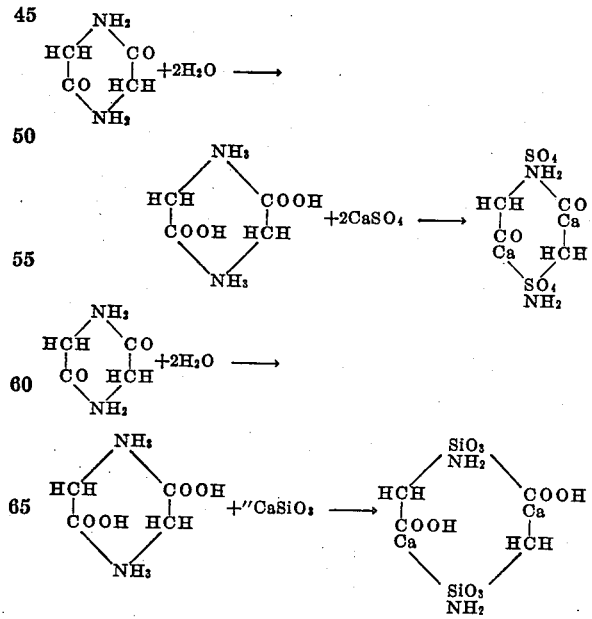

It should be emphasized that the products of all these reactions are themselves of value in the boiler conditioning, since they serve to nullify the cementing effect of silica in the boiler.

It will be observed also that there is a positive reaction between the protein content of the soya bean flour and silica, so that the inhibiting effect of the soya bean flour on silica deposition is by reaction, as well as by the mechanical effect of the product of reaction between the protein and calcium and magnesium.

I have found that reaction with an alkaline reagent is necessary only when the boiler alkalinity is so low that the boiler-conditioning material should add to the pre-existing alkalinity in the boiler. Thus, if the boiler alkalinity be less than four or five grains per gallon total alkalinity, either the soya bean flour, or the reaction product of soya bean flour with phosphoric lactic, or citric acid should be reacted with sodium hydroxide, potassium hydroxide, ammonium hydroxide, or other alkaline reagents capable of forming a water-soluble compound with the protein, or acid-reacted protein, prior to its introduction to the boiler. If, however, conditions are such that the boiler concentrates are adequately on the alkaline side, such alkaline reaction is unnecessary.

Considering the soya bean flour from the standpoint of its contained protein glycinin, I have found that proteins extracted from all the legumes and the nuts may be satisfactorily used for boiler conditioning, when first rendered soluble by reaction with a suitable acid such as phosphoric acid, lactic acid, or citric acid.

I have also successfully used without previous reaction the protein glycinin, extracted from soya beans, and the protein from peanuts and walnuts. As noted in my co-pending applications to which reference has been made above, casein is a protein suitable for use when reacted with either phosphoric acid or lactic acid and is similarly useful when reacted with citric acid. It also may, if desired, be used without reaction as a boiler-conditioning agent. I may state as a general proposition that all the proteins of legumes and nuts, as well as casein, which are in measure soluble in water containing the high alkaline concentration, or high acid concentration, may be used without any previous reaction. In practical effect, it being inadmissible to carry a high acid concentration in boiler water, those proteins of legumes and nuts which are soluble in boiler water which is well on the alkaline side may suitably be used without previous reaction.

I have also found that the oil-free means of those legumes and nuts, which do not comprise a high proportion of fibrous material may any of them be used to condition a boiler water having relatively high alkalinity. As exemplary of such flours and means, I may name soya bean flour, peanut meal, pea meal, and cashew nut meal. Of these, soya bean flour and peanut meal are to be preferred, since the proteins of both are notably amphoteric in character, and since both of them are not only low in cost, but possess also the advantage of containing a relatively low percentage of fibrous material.

Another valuable feature which I developed through the use of proteins is that they in themselves do not cause foaming but definitely neutralize these effects in waters that do carry other constituents responsible for conditions of this kind.

I also have found that the addition of a proportionally small amount of protein, as for example that represented by 5% of soya bean flour, is useful in conjunction with boiler conditioning compositions containing starch and phosphoric acid reaction products. This is because the inclusion of the protein makes possible the use of inhibitors developed specially for preventing the phosphoric acid corrosion of steel shipping containers, but which are normally rendered ineffective by starch. The use of such inhibitors has thus not been possible in compositions consisting solely of the phosphoric and starch products. This small addition of protein to a phosphoric starch reaction product, now permits the shipment of these products in steel containers at less expense and without the fear of leakage or loss of the products in shipment; this being a decided economic advantage over the existing practice of sending the materials in wax-lined wooden barrels.

I claim as my invention:

1. The herein described method of conditioning the water for boilers and like heating instrumentalities consists in rendering water-soluble the oil-free protein of legumes and nuts containing a relatively low proportion of fibrous material by reacting such oil-free protein-containing substance with an acid selected from lactic acid, phosphoric acid, and citric acid; and by introducing the resulting highly dispersible reaction product into a heating instrumentality containing water with a calcium-magnesium, silica, and sulphate content reacting this prepared mealy product chemically with the calcium, magnesium, silica, and sulphate radicals, to produce a non-crystalline reaction product which is mechanically effective in inhibiting the scale-forming deposition of silica.

2. The herein described method of conditioning the water for boilers and like heating instrumentalities containing calcium and magnesium which consists in supplying to the heating instrumentality water having a substantial alkaline balance, and by maintaining in the water a highly dispersible amphoteric protein having solubility in alkaline water solutions effecting chemical reactions between calcium, magnesium, sulphate, and silica radicals in the water and the protein with formation of a non-crystalline reaction product tending mechanically to inhibit the scale-forming deposition of silica.

3. The herein described method of bringing concentrates containing calcium and magnesium in boilers and the like water-heating instrumentalities below a concentration of those radicals at which deposition of the radicals of those elements combined with sulphate radicals will take place, which consists in reacting with calcium and magnesium radicals of the concentrate of calcium and magnesium produced by operation of the boiler an extracted protein rendered soluble by reaction with an acid selected from phosphoric, lactic, and citric acids.

4. The herein described method of bringing concentrates containing calcium and magnesium in boilers and the like water-heating instrumentalities below a concentration of those radicals at which deposition of the radicals of those elements combined with sulphate radicals will take place, which consists in introducing into the water constituting the concentrate of those radicals an amphoteric oil-free extracted protein, and by establishing a substantial alkaline balance in the water-heating instrumentality thereby rendering the said amphoteric protein soluble with consequent reaction of the protein with the calcium and magnesium radicals of the concentrate.

5. The herein described method of bringing concentrates containing calcium and magnesium in boilers and the like water-heating instrumentalities below a concentration of those radicals at which deposition of the radicals of those elements combined with sulphate radicals will take place, which consists in reacting with calcium and magnesium radicals of the concentrate the amphoteric protein glycenin rendered soluble by reaction with an acid selected from phosphoric, lactic, and citric acids.

6. The herein described method of bringing concentrates containing calcium and magnesium in boilers and the like water-heating instrumentalities below a concentration of those radicals at which deposition of the radicals of those elements combined with sulphate radicals will take place, which consists in reacting with calcium and magnesium radicals of the concentrate the amphoteric protein glycenin rendered soluble by reaction with an acid selected from phosphoric, lactic, and citric acids.

7. The herein described method of bringing concentrates containing calcium and magnesium in boilers and the like water-heating instrumentalities below a concentration of those radicals at which deposition of the radicals of those elements combined with sulphate radicals will take place, which consists in introducing the amphoteric protein glycenin into the water constituting the concentrate of those radicals and containing a substantial alkaline balance, and by the effect of the substantial alkaline balance in the water-heating instrumentality rendering the said amphoteric protein soluble with consequent reaction of the protein with the calcium and magnesium radicals of the concentrate.

8. The herein described method of bringing concentrates containing calcium and magnesium in boilers and the like water-heating instrumentalities below a concentration of those radicals at which deposition of the radicals of those elements combined with sulphate radicals will take place, which consists in introducing the amphoteric protein casein into the water constituting the concentrate of those radicals and containing a substantial alkaline balance, and by the effect of the substantial alkaline balance in the water-heating instrumentality rendering the said amphoteric protein soluble with consequent reaction of the protein with the calcium and magnesium radicals of the concentrate.

CYRUS. WM. RICE.